United States Patent
Townsley

(10) Patent No.: US 11,183,820 B2
(45) Date of Patent: Nov. 23, 2021

(54) CABLE POSITION STOPPER

(71) Applicant: BAE Systems plc, London (GB)

(72) Inventor: Jonathan Richard Townsley, Farnborough (GB)

(73) Assignee: BAE Systems plc, London (GB)

( * ) Notice: Subject to any disclaimer, the term of this patent is extended or adjusted under 35 U.S.C. 154(b) by 44 days.

(21) Appl. No.: 16/635,825

(22) PCT Filed: Jul. 30, 2018

(86) PCT No.: PCT/GB2018/052155
§ 371 (c)(1),
(2) Date: Jan. 31, 2020

(87) PCT Pub. No.: WO2019/025772
PCT Pub. Date: Feb. 7, 2019

(65) Prior Publication Data
US 2021/0135435 A1 May 6, 2021

(30) Foreign Application Priority Data

Aug. 1, 2017 (EP) ..................................... 17184351
Aug. 1, 2017 (GB) ..................................... 1712382

(51) Int. Cl.
*H02G 1/08* (2006.01)
*H01B 7/40* (2006.01)
(Continued)

(52) U.S. Cl.
CPC ................. *H02G 1/08* (2013.01); *H01B 7/40* (2013.01); *H01B 17/66* (2013.01); *H02G 3/0481* (2013.01); *H02G 15/00* (2013.01)

(58) Field of Classification Search
CPC ........ H02G 1/08; H02G 3/0481; H02G 15/00; H02G 9/06; H02G 3/08; H02G 11/02; H01B 7/40; H01B 17/66
(Continued)

(56) References Cited

U.S. PATENT DOCUMENTS 4,268,041 A * 5/1981 Sovish ...................... F16L 5/02
174/667
4,300,665 A 11/1981 Arechaga
(Continued)

FOREIGN PATENT DOCUMENTS

DE 4225267 A1 9/1993
EP 0715385 A1 6/1996
(Continued)

OTHER PUBLICATIONS

International Preliminary Report on Patentability for Application No. PCT/GB2018/052155 dated Feb. 4, 2020, 9 pages.
(Continued)

*Primary Examiner* — Timothy J Thompson
*Assistant Examiner* — Michael F McAllister
(74) *Attorney, Agent, or Firm* — Maine Cernota & Rardin

(57) ABSTRACT

An apparatus for use with a cable, wherein the apparatus comprises a conduit and a stopper, wherein the stopper is formed in one or more parts from a plastic; the stopper comprises an internal hole which is configured to accommodate a cable and the stopper has an outer surface of which at least a part conforms to the geometry of one end of the conduit; the geometry of the one end of the conduit is flared and accommodates the shape of the stopper; and the conduit is configured to accommodate the cable.

13 Claims, 4 Drawing Sheets

(51) Int. Cl.
*H01B 17/66* (2006.01)
*H02G 15/00* (2006.01)
*H02G 3/04* (2006.01)

(58) Field of Classification Search
IPC .............. H02G 1/08,9/06, 3/08, 11/02, 3/0481; H01B 7/40, 17/66
See application file for complete search history.

(56) References Cited

U.S. PATENT DOCUMENTS

| | | | | |
|---|---|---|---|---|
| 4,332,975 | A * | 6/1982 | Dienes | H02G 15/013 174/76 |
| 6,003,873 | A * | 12/1999 | Solberg | F16L 55/128 277/323 |
| 6,476,322 | B1 * | 11/2002 | Dunne | H02G 3/0481 174/661 |
| 6,611,230 | B2 * | 8/2003 | Phelan | H01P 1/181 333/161 |
| 8,778,238 | B2 * | 7/2014 | Beigel | B29C 66/91411 264/1.25 |
| 9,425,604 | B1 | 8/2016 | Lawrence | |
| 2010/0003001 | A1 * | 1/2010 | Hand | H02G 3/0625 385/138 |
| 2011/0018210 | A1 * | 1/2011 | Beele | F16L 5/10 277/606 |
| 2015/0128681 | A1 * | 5/2015 | Stier | H02G 15/003 73/23.31 |
| 2019/0003278 | A1 * | 1/2019 | Varkey | E21B 34/14 |

FOREIGN PATENT DOCUMENTS

| | | |
|---|---|---|
| FR | 2488457 A1 | 8/2012 |
| WO | 2005081375 A1 | 9/2005 |

OTHER PUBLICATIONS

PCT International Search Report and Written Opinion for Application No. PCT/GB2018/052155 dated Oct. 17, 2018, 15 pages.
Hanney Reels: "Hanney Reels & Hose Cable Stops—Dultmeier Sales", Oct. 19, 2008 (Oct. 19, 2008), XP055447850, Retrieved from the Internet: URL:https://web.archive.org/web/20081019083115/ https://www.dultmeier.com/products/0.698.1048.2265/1779 [retrieved on Feb. 5, 2018].
Inc. Provided By Federal Information & News Dispatch: "47—Pipe, Tubing, Hose & Fittings—4" Diameter PVC Conduit Flared at One End, Commerce Business Daily, Mar. 16, 1999 (Mar. 16, 1999), XP055514509, Washington, Retrieved from the Internet: URL:https://web.archive.org/web/20150609143945/https:// kennedyguan.en.made-in-chine.com/product/gMyQGwAVCKRe/ China-PVC-Pipe-with-Flared-End.html# [retrieved on Oct. 11, 2018].
Extended European Search Report for Application No. 17184351.9 dated Feb. 8, 2018, 11 pages.
Great Britain Search Report for Application No. GB1712382.9 dated Jan. 26, 2018, 3 pages.

* cited by examiner

CABLE POSITION STOPPER

RELATED APPLICATIONS

This application is a national phase application filed under 35 USC § 371 of PCT Application No. PCT/GB2018/052155 with an International filing date of Jul. 30, 2018 which claims priority of GB Patent Application 1712382.9 filed Aug. 1, 2017 and EP Patent Application 17184351.9 filed Aug. 1, 2017. Each of these applications is herein incorporated by reference in its entirety for all purposes.

FIELD OF THE INVENTION

The present invention relates to a cable position stopper for use in the positioning and installation of a cable and connectors to a piece of equipment.

BACKGROUND

When installing equipment it is common to connect cables and connectors to the equipment. The position of the equipment can make the connection and/or the positioning of the cable difficult to install. The equipment may be positioned in a place which means that the weight of the cable pulls down on the connector. This problem can be exacerbated by adverse operating conditions. One way of reducing the effect of the tension on the connector is to place the cable in a conduit, often of metal, between the equipment and the other end of the cable. In order to stop the cable moving relative to the conduit it is traditional to use a potted bung positioned within, or at the end of, the conduit to prevent the cable from moving.

The potted bung is traditionally made from a rubberised compound. The use of such rubberised bungs does not always provide the necessary positional accuracy required for the consistent life of the cable. In addition, the rubberised materials tend to bond themselves to the metal component of the conduit when in constant contact and particularly when put through elevated heat cycles. This leads to the cable becoming stuck within the conduit and the effect of the conduit being less useful in terms of reducing the tension in the connector.

One object of the present invention is to provide a cable stopper which overcomes at least some of the problems of the prior art rubberised bungs.

SUMMARY OF THE INVENTION

According to an aspect of the present invention there is provided an apparatus with a cable, wherein the apparatus comprises a conduit and a stopper, wherein the stopper is formed in one or more parts from a plastic, the stopper comprises an internal hole which accommodates the cable and the stopper has an outer surface of which at least a part conforms to the geometry of one end of the conduit, the geometry of the one end of the conduit is flared and accommodates the shape of the stopper and the conduit accommodates the cable.

According to another aspect of the present invention there is provided an apparatus, wherein the apparatus comprises a conduit and a stopper, wherein: the stopper is formed in one or more parts from a plastic, the stopper comprises an internal hole which is configured (or adapted) to accommodate a cable and the stopper has an outer surface of which at least a part conforms to the geometry of one end of the conduit, the geometry of the one end of the conduit is flared and accommodates the shape of the stopper; and the conduit is configured (or adapted) to accommodate the cable.

According to a further aspect of the present invention there is provided a method of inserting a cable into a conduit, wherein the method comprises: attaching a stopper to the cable, wherein the stopper has an outer surface of which at least a part conforms to the geometry of an end of the conduit, the stopper is formed of one or two parts of a plastic, the stopper comprises an internal hole which accommodates the cable; inserting the cable into the conduit, wherein the conduit has a flared section at one end which accommodates the shape of the stopper.

Preferably, the stopper has a circular cross-section.

Preferably, the stopper is oval in shape.

Preferably, the stopper comprises a gripping mechanism to hold the stopper in a predetermined position on the cable.

Preferably, the gripping mechanism comprises one or more of a gripping member and adhesive.

Preferably, the stopper is made of a single part bonded to the cable in the manufacture thereof.

Preferably, the stopper comprises two or more parts adapted to be connected together in use around the cable at a predetermined location.

Preferably, the stopper is made of two parts.

Preferably, the stopper includes a hinge along one edge.

Preferably, the two parts are adapted to snap together around the cable in use.

Preferably, the stopper includes one or more grooves in the surface area for receiving a fastener that can be tensioned to hold two or more parts together.

Preferably, the fastener is a zip-tie.

Preferably, the plastic has a glass transition temperature greater than 65 degrees Celsius.

Preferably, the plastic is a polyamide, a polyaryletherketone, a polycarbonate, or any combination thereof.

Preferably the conduit is made of aluminium or an aluminium alloy.

According to an aspect of the present invention there is provided a stopper for attachment to a cable, the cable being intended to be inserted in to a conduit; the stopper comprising: an internal hole intended to accommodate the cable and an outer surface of which at least a part is adapted to conform to the geometry of an end of the conduit; wherein the stopper is formed in one or more parts from a plastics material (a plastic); and in use the stopper is fitted within the conduit and is able to move with a degree of angular articulation.

According to an aspect of the present invention there is provided a cable, including a stopper according to another aspect of the present invention.

According to an aspect of the present invention there is provided a conduit adapted to accommodate a cable having a stopper according to another aspect of the present invention.

According to an aspect of the present invention there is provided a combination of a conduit according to an aspect of the present invention, a cable according to an aspect of the present invention and a stopper to an aspect of the present invention.

According to an aspect of the present invention there is provided a method of manufacturing a stopper for use with a cable to be inserted in a conduit having a predetermined geometry at an end thereof, the method comprises: determining a shape of the predetermined geometry of the conduit; forming the stopper of one or two parts of a plastics material having at least a part conforming to the geometry of the conduit; and attaching the stopper to the cable.

DETAILED DESCRIPTION

Figure 1:
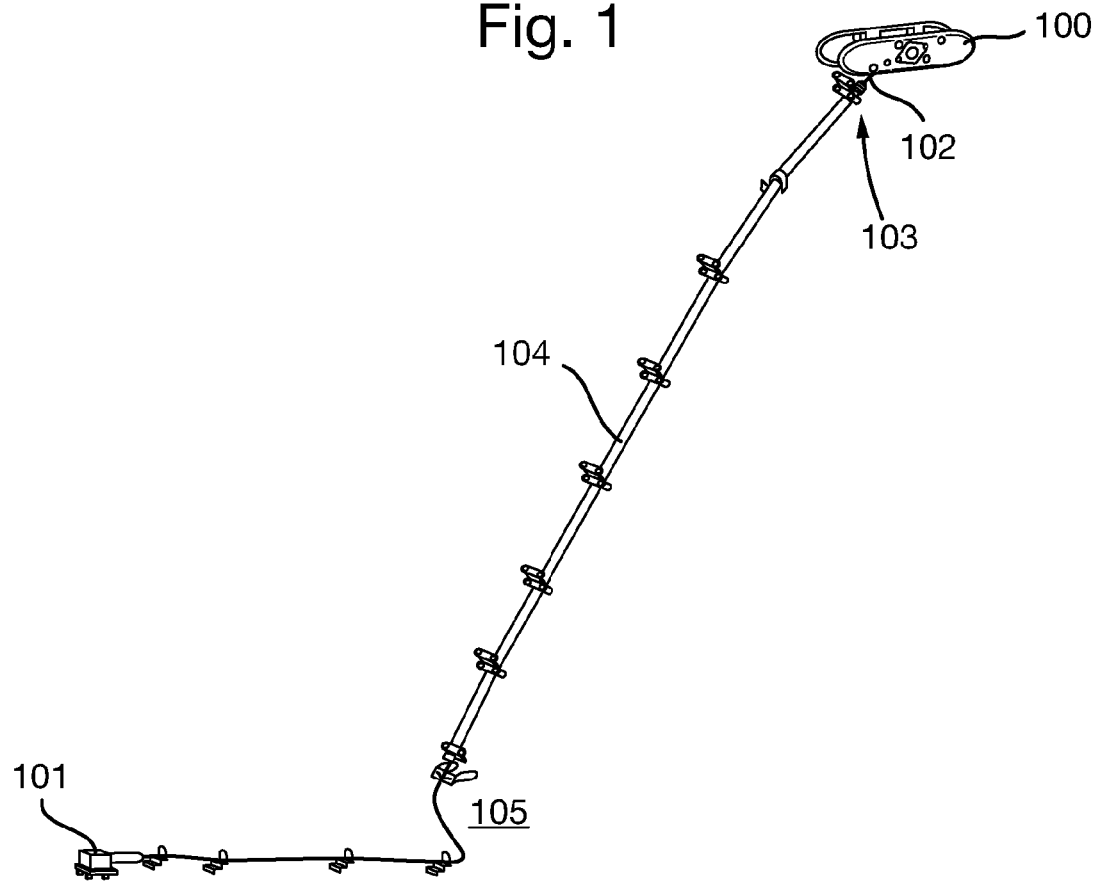
FIG. 1 shows a prior art cable and equipment connected in a particular environment.

FIG. 1 shows a typical set up with a piece of equipment 100 (for example an antenna mounting) connected at one end 101 to a connection (for example, an electrical connection) and to a far end 102 by a cable 103. At a certain point the cable is placed within a conduit 104 (a routing conduit) which extends from the ground 105 to the position of the equipment. The (far) end of the cable 102 is continually under tension which can affect the connection of the connector. The rubberised bung provides some relief from this but suffers from the inherent problems identified above. As a result, a need exists for a new type of conduit and stopper for preventing the tensions on the connector in any environment.

Figure 2:
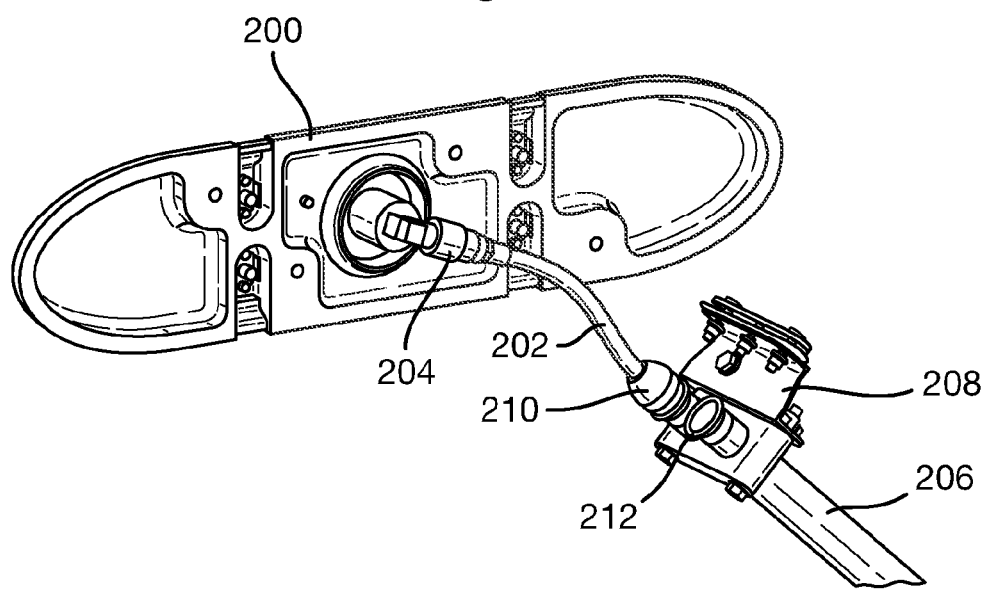
FIG. 2 is a view of a connector and cable conduit according to one aspect of the present invention.

According to FIG. 2 a piece of equipment 200 (for example an antenna mounting plinth) is shown connected to a cable 202 (for example a RF cable) by means of a connector 204. Part of the cable is held within a conduit 206 (for example an aluminium alloy conduit) which may be secured to a surface in the vicinity of the equipment by a mounting 208. A stopper 210 is located at the top end of the conduit 206 (i.e. the end of the conduit closest to the equipment 200/mounting 208 and furthest from the ground) and fits within the opening to hold the cable in a desired position. The top of the conduit has a flared top section 212 to accommodate the shape of the stopper. In other words, at one end of the conduit 206 the sides/walls of the body of the conduit 206 taper outwards. The sides/walls of the conduit 206 taper outwards to form an end structure, for example a conical section, that functions to hold/retain the stopper 210. The stopper 210 has a larger maximum diameter than the maximum diameter of the body of the conduit 206. To be more precise the stopper of the present invention sits in the top of the flared conduit geometry 212 and stops any cable loads being transferred to the connector. The cable remains relatively flat and the movement of the cable relative to the equipment does not disengage the connector. When the stopper is attached to the cable, the cable does not kink (or substantially kink or deform) within the conduit. This is particularly advantageous for applications where it would be detrimental for the cable to be significantly deformed, for example when the cable is a RF cable in antenna applications, where kinking of the cable could potentially cause signal loss.

The stopper is adapted to be shaped so that it sits correctly within the geometry of the conduit. The shape of the conduit is any predetermined shape which can hold the stopper and support the cable to prevent the cable being damaged and to enable the tension in the cable to be dissipated so that the connector is not pulled out of the connection.

The conduit, connector and stopper of the present invention can be used on any equipment installation on any platform that may have adverse conditions in the service life of the cable or connector. Such conditions may include high gravitational forces and aggressive vibration coupled with increased temperature ranges. The invention does promote a rugged nature of equipment installation and avoids failures and potentially increases service life. The invention is applicable to any environment where equipment needs to be connected to a cable housed within a conduit. Typical examples of such environment might be on an aircraft (for example an aircraft fin), a boat or a land vehicle of any type. However, this is not intended to be a limitation to the possible use of the present invention. In the various embodiments above only one cable, with one stopper and one conduit are discussed. It will be appreciated however that two or more conduits (with respective cable and stopper) may run into the mounting thus allowing two or more cables to be connected to the equipment.

Figure 3A:
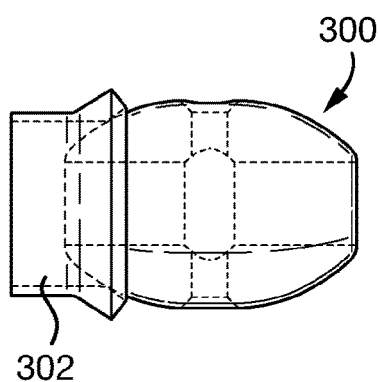
FIGS. 3A and 3B are design drawings of the cable stopper, according to an embodiment of the present invention.
Figure 3B:
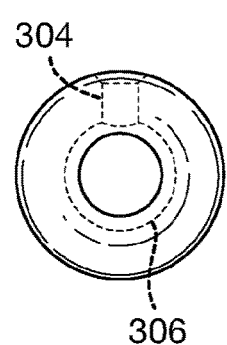

Referring to FIGS. 3A and 3B the stopper 300 is shown in greater detail. The figures include a number of general dimensions and angles. These dimensions are not intended to be limitative and are shown only by way of example. As can be seen from FIG. 3B the stopper has a circular cross section; and is tapered at either end as shown in FIG. 3A. The shape of the taper on either end is intended to accommodate the conduit geometry 302 as shown in FIG. 3A.

Figure 5:
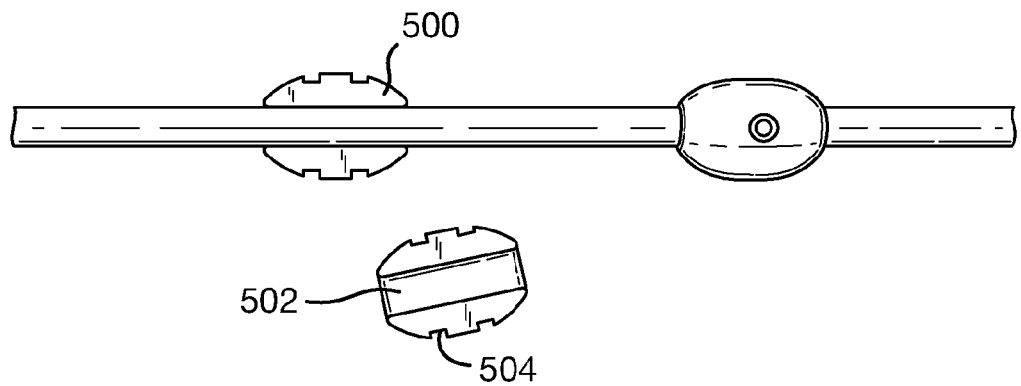
FIG. 5 is a diagram showing the cable stopper in two parts which can be combined together, according to an embodiment of the present invention.

The body of the stopper includes a number of grooves or holes intended to secure the stopper to the cable and to ensure that there is a tight fit around the cable. To this end, the stopper may be made in two halves as shown in FIG. 5 and then connected together by means of a fastener. This will be described in greater detail below.

In the case of a one-piece design, an injection port 304 is provided to allow for consistent injection of adhesive. Suitable adhesives are epoxy adhesives such as a two-part room temperature cure epoxy adhesive (for example Master-Bond's® EP31 or EP42HT-2LO). An annular ring feature 306 is used to allow for even consistent distribution of adhesive around the cable when the stopper is fixed to the cable in the manufacturing process. The stopper can thus be bonded on to the cable during manufacture and permanently fixed in position. Manufacture of the cable with the integrated stopper is one example of how the stopper can be used in conjunction with the cable. However, other manners in which the cable and stopper can be combined are also intended to be included in the present invention.

The stopper comprises at least one plastic (for example a thermoset plastic or thermoplastic). Preferably the plastic is a thermoplastic with a glass transition temperature (Tg) of from about 50° C. to 250° C., 50° C. to 200° C., 50° C. to 175° C., 50° C. to 150° C., 50° C. to 100° C. The plastic may have a Tg in excess of about 40° C., 50° C., 60° C., 65° C., 70° C., 80° C., 90° C., 100° C., 110° C., or 120° C. The at least one plastic also preferably has a melting temperature in excess of 150° C., more preferably in excess of about 160, 170, 180, 190, 200, 210, 220, 230, 240, 250, 260, 270, 280, 290 or 300° C. For example, the stopper may be manufactured from a plastic such as a nylon (for example polyamide (nylon) 6.6), a polyaryletherketone, such as polyetheretherketone (PEEK) or a polycarbonate, or any combination thereof. Any other similar type of material can be used. Indeed, the stopper could be made from a metal or metal alloy such as aluminium, steel or brass or any such metal/metal alloy with abrasive resistance. The material is intended to be of a type that would not be affected by exposure to temperature (for example above temperatures of about 80° C.) or frequent heat cycles and therefore would not slip within, or stick to (e.g. self-bond), the conduit as has been a problem of prior art bungs. In other words, the material used for the stopper is intended to facilitate the free movement and easy extraction of the cable when required even after being exposed to temperatures above 80° C. As such, rubber would not be a suitable material for the stopper. The shape of the stopper is designed to fit with a predetermined conduit having a predetermined shape at the end thereof. The use of a conduit having a flare or other conduit geometry, as described above allows a degree of angular articulation as the cable exits the conduit. In addition, the use of the curved edge as described above, avoids any sharp edges near the bend radius in the cable and therefore there is less likelihood of the cable being damaged by the edge of the conduit.

The conduit is shown having circular cross section and an elongated overall form. However, it will be appreciated that different shapes and cross sections are equally usable as long as the conduit is of a substantially corresponding shape. Examples of different shapes include cubes, squares and any other appropriate geometrical shape.

Figure 4:
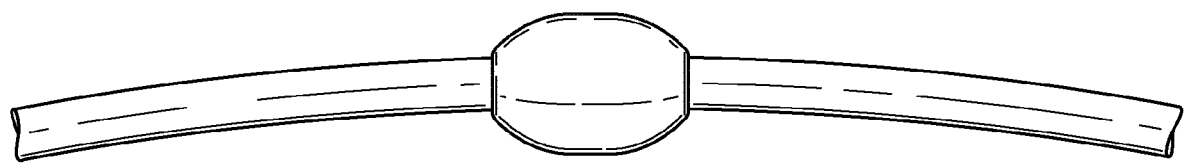
FIG. 4 is a diagram showing the cable stopper in place on a cable, according to an embodiment of the present invention.

As previously mentioned FIG. 4 shows the stopper adhered to the cable during its manufacture as a one part plastic moulding. The stopper may grip the cable via a gripping mechanism, methods or processes other than adhesive. For example, the internal surface of the stopper may include gripping members which grip the cable and hold the stopper in the required location along the cable and stop the stopper from moving in location in the conduit.

Figure 6:
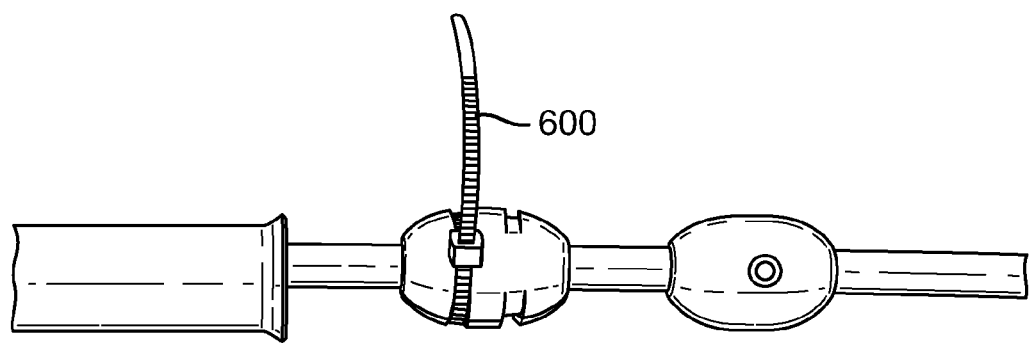
FIG. 6 is a diagram showing the cable stopper in two parts combined together, according to an embodiment of the present invention.

Referring to FIG. 5, as previously suggested the stopper may be manufactured so that it can be fitted or retrofitted to a cable after the cable has been manufactured. In this case, the stopper is formed of two or more parts 500 and 502. In the illustrated example, the two parts include a number of grooves 504 which are intended to enable the stopper to be connected together. As shown in FIG. 6 the two parts of the stopper 500 and 502 can be combined together by means of a zip-tie 600. It will be appreciated that as there are two grooves in the example shown there may be two zip connectors 600. However, in other embodiments a single zip connector may be sufficient.

The stopper could be manufactured as two halves that have a hinge down one side and snapped together around the cable to allow fitment after cable manufacture. This approach would encompass a self-locking feature to keep the stopper in a closed condition and clamped to the cable. The stopper could be assembled around the cable using two half components secured using standard zip-ties as previously described. This could be used in conjunction with a series of annular gripping features within the stopper to aid secure placement of the stopper relative to the cable. The annular gripping feature could be used on any of the different embodiments described above.

An advantage of having a removable, two part fastener is that the stopper could be removed and repositioned either during installation or after installation as required. Adjustment in this way means that the benefits of the present invention can be realised by adjustment if the initial positioning of the stopper on the cable is not in the right position.

An alternative to using grooves 504 and a zip fastener 600 would be to include a number of small fasteners to connect the two halves together. These fasteners may be of any appropriate nature and include small screws and other types of fastening.

Figure 7:
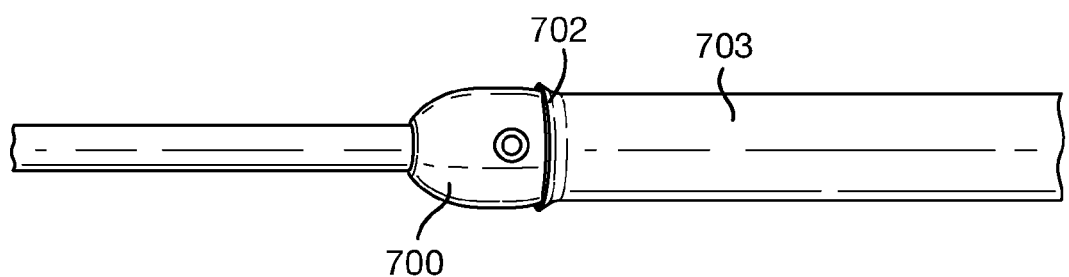
FIG. 7 shows a cable stopper in situ in a conduit, according to an embodiment of the present invention.

Referring now to FIG. 7, the conduit 703 is shown with a flared end 702. The stopper 700 is shown in position within the flared opening of the conduit 700. As previously indicated the conduit may be any shape or size and used in any environment. The opening at the end of the conduit may be any shape or size and the stopper is ideally adapted to cooperate with the geometry of the opening so that the required articulation of the "joint" between the cable and the conduit is achieved. The joint is the point of contact between the conduit end and the stopper, which allows movement of the cable and as necessary absorbs the forces that might disengage the connector from the equipment to which it is connected. In essence, the stopper 700 sits in the flared opening/mouth of the conduit 703. The stopper 700 is preferably not affixed to the conduit 703. This means that the stopper 700 can be easily positioned into place in the mouth of the conduit 703. The forces are essentially absorbed by the degree of articulation which occurs at the joint. That articulation will depend on the relative shapes of the stopper and conduit and the intrinsic local forces. One such force is generated by the weight of the cable relative to the location on the connector and the conduit.

In the various embodiments shown above the stopper is shown entirely surrounding the cable however it will be appreciated that in certain circumstances two parts of the stopper could only partially surround the cable leaving gaps in the stopper that are not in contact with the cable and/or the conduit, in use. In this situation, the gripping features could be located at the edges of the parts of the stopper to ensure that they do not move relative to the cable towards one and other.

It should be noted that the stopper may be made of more than two parts and may be made up of many different parts connected together in which of a manner makes sense for the nature of the conduit.

Figure 8:
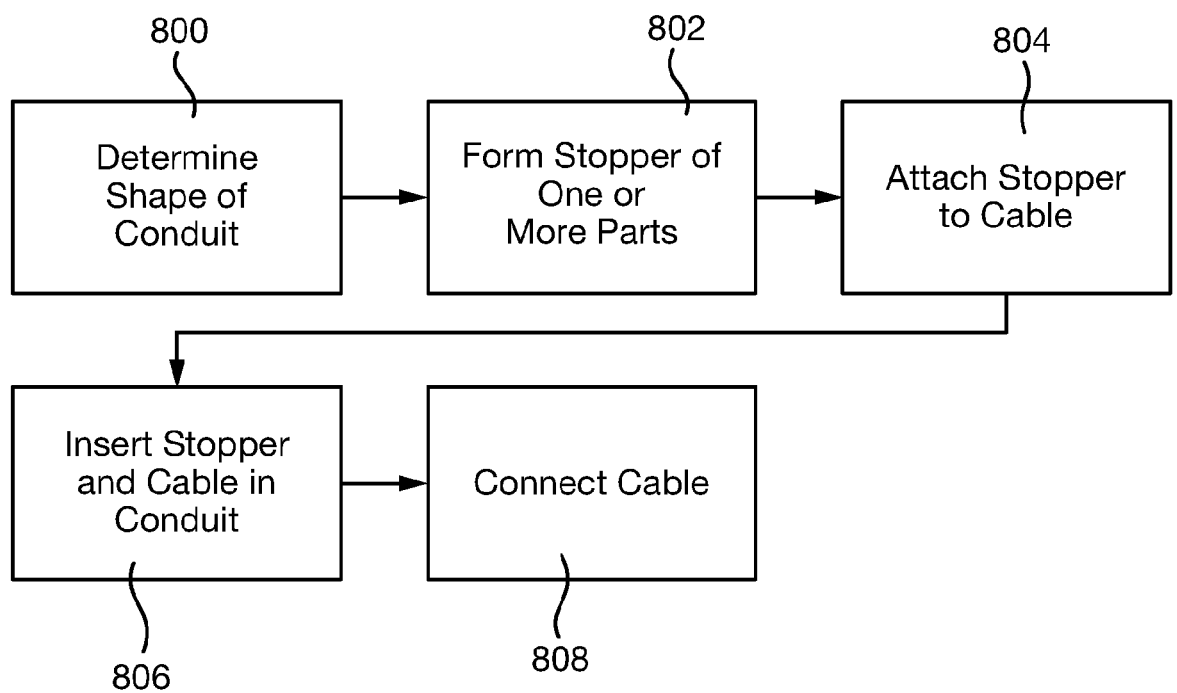
FIG. 8 is a flow chart showing a method of manufacture of the stopper, according to an embodiment of the present invention.

Referring to FIG. 8, a method of manufacturing a cable for connection to equipment will now be described. In the first step 800 a determination is made of the shape of the conduit and the expected location of the stopper. At step 802 the stopper is formed of one or more parts as required by the design. At step 804 the stopper is attached to the cable. As previously indicated this may be part of the manufacturing process of the cable. Alternatively, this may be a separate process from the manufacturer of the cable where the stopper is retrofitted to the cable after the cable has been manufactured. In this second case attachment of the stopper may be made by means of an appropriate fasten mechanism as discussed above. This fasten mechanism may include zip-ties, screws or other types of fastening. At step 806 the stopper and cable are inserted into the conduit. It will be appreciated that inserted into the conduit in reference to the stopper means that the stopper sits within the flared top section of the conduit whereas inserting the cable in the conduit means housing or accommodating the cable in the body of the conduit (e.g. the cable runs through the length of the conduit). At step 808 the integrated cable and conduit is ready for use and the cable may be connected to whatever equipment is required.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

What is claimed is:

1. An apparatus configured to prevent an electrical cable from sliding through a surrounding electrical conduit, the apparatus comprising:
    a stopper formed in one or more parts, the stopper including an internal hole extending between opposing ends of the stopper and configured to enable the electrical cable to pass therethrough; and
    an electrical conduit having an end that is flared and shaped to accommodate a shape of one of the ends of the stopper so that the stopper can nest therein but cannot pass therethrough, and so that a degree of angular articulation of the stopper relative to the flared and shaped end of the conduit is allowed while the stopper remains nested in the flared and shaped end of the conduit;
    the stopper further including a gripping mechanism configured to hold the stopper in a predetermined position on the electrical cable.

2. The apparatus of claim 1, wherein the stopper has a circular cross-section.

3. The apparatus of claim 1, wherein the gripping mechanism comprises one or more of a gripping member and adhesive.

4. The apparatus of claim 1, wherein the stopper is made of a single part and is bonded to the electrical cable in the manufacture thereof.

5. The apparatus of claim 1, wherein the stopper comprises two or more parts adapted to be connected together around the electrical cable at a predetermined location.

6. The apparatus of claim 5, wherein the stopper is made of two parts.

7. The apparatus of claim 5, wherein the stopper includes a hinge along an edge thereof.

8. The apparatus of claim 5, wherein the two parts are adapted to snap together around the electrical cable.

9. The apparatus of claim 5, wherein the stopper includes one or more grooves provided in a surface thereof and configured for receiving a fastener that can be tensioned to hold the two or more parts together.

10. The apparatus of claim 9, wherein the fastener is a zip-tie.

11. The apparatus of claim 1, wherein the stopper is made from a plastic that has a glass transition temperature greater than 65 degrees Celsius.

12. The apparatus of claim 1, wherein the stopper is made from a plastic that is a polyamide, a polyaryletherketone, a polycarbonate, or a combination of at least two thereof.

13. A method of preventing an electrical cable from sliding through a surrounding electrical conduit, the method comprising:
    providing an electrical conduit having a flared end;
    providing a stopper having an internal hole extending between opposing ends of the stopper and configured to enable the electrical cable to pass therethrough, the stopper further including a gripping mechanism configured to fix the stopper at a predetermined position on the electrical cable, at least one end of the stopper having an outer surface that conforms to the flared end of the electrical conduit, so that the stopper can nest therein but cannot pass therethrough and so that a degree of angular articulation of the stopper relative to the flared and shaped end of the conduit is allowed while the stopper remains nested in the flared and shaped end of the conduit;
    inserting the electrical cable through the electrical conduit;
    inserting the electrical cable through the internal hole of the stopper;
    moving the stopper to the predetermined position on the electrical cable;
    causing the gripping mechanism to fix the stopper to the electrical cable; and
    nesting the stopper in the flared end of the electrical conduit.

* * * * *